United States Patent [19]

Joseph et al.

[11] Patent Number: 5,098,272
[45] Date of Patent: Mar. 24, 1992

[54] APPARATUS FOR MOLDING COMPOSITE METAL-ELASTOMER WHEELS

[75] Inventors: Jeffrey S. Joseph, Perrysburg; Robert F. LaForme, Genoa, both of Ohio

[73] Assignee: Motor Wheel Corporation, Lansing, Mich.

[21] Appl. No.: 345,427

[22] Filed: May 1, 1989

[51] Int. Cl.⁵ ............................................. B29C 45/14
[52] U.S. Cl. .................................. 425/127; 249/56; 264/46.4; 264/331.19; 264/328.12; 301/37 P; 301/63 PW; 425/543
[58] Field of Search .............. 425/110, 112, 116, 117, 425/127, 543, 450.1, 589; 249/56; 301/37 R, 37 P, 63 PW; 264/46.5, 46.4, 337, 338, 331.19, 54, 338, 262, 161, 163, 207, 328.9, 328.12

[56] References Cited

U.S. PATENT DOCUMENTS

| | | | |
|---|---|---|---|
| 3,669,501 | 6/1972 | Derleth | 301/37 R |
| 3,756,658 | 9/1973 | Adams | 301/37 R |
| 3,762,677 | 10/1973 | Adams | 301/37 P |
| 3,815,200 | 6/1974 | Adams | 264/46.4 |
| 3,823,982 | 7/1974 | Spisak | 301/37 R |
| 3,918,762 | 11/1975 | Hampshire | 301/37 P |
| 3,935,291 | 1/1976 | Jackson | 264/54 |
| 3,956,451 | 5/1976 | Adams | 264/45.4 |
| 3,998,494 | 12/1976 | Spisak | 301/37 P |
| 4,017,239 | 4/1977 | Karlsson | 425/110 |
| 4,251,476 | 2/1981 | Smith | 301/37 R |
| 4,398,770 | 8/1983 | Smith | 301/37 P |
| 4,659,148 | 4/1987 | Grill | 301/37 P |
| 4,682,820 | 7/1987 | Stalter | 301/37 P |
| 4,712,765 | 12/1987 | Sabet | 425/127 |
| 4,786,027 | 11/1988 | Stalter, Sr. | 425/117 |
| 4,790,605 | 12/1988 | Stalter, Sr. | 301/37 P |
| 4,847,030 | 7/1989 | Stalter | 264/262 |

FOREIGN PATENT DOCUMENTS 1290946 9/1972 United Kingdom .

OTHER PUBLICATIONS

Dubois and Pribble, "Plastics Mold Engineering Handbook", 1978, pp. 399–410.
Rosato and Rosato, "Injection Molding Handbook", 1986, pp. 160, 183–186.

Primary Examiner—Timothy Heitbrink
Attorney, Agent, or Firm—Barnes, Kisselle, Raisch, Choate, Whittemore & Hulbert

[57] ABSTRACT

Apparatus for molding a composite metal-elastomer styled wheel in which a middle mold part includes a metal wheel disc and rim subassembly. A base mold part seats against the outboard face of the metal wheel in the closed condition of the mold and has a mold cavity surface to provide an ornamental configuration for the outboard face of the decorative plastic body of the composite wheel. A clamp seats against the inboard face of the middle mold part to urge the middle part into sealing engagement with the base mold part. The mold parts are axially separable from one another to open the molding apparatus to clear the middle mold part from said clamp and base mold parts. The clamp includes a funnel adapted for registry with a liquid reaction mixture injection nozzle coupled with injecting mixing apparatus. The funnel has a nozzle passage registering with a bolt-hole pour opening in the disc in the closed condition of the mold. A sprue passageway is provided in a core part affixed to the base mold part in juxtaposed relation to the disc pour opening and cooperates with the margin of the pour opening to define an increasingly restricted sprue passageway to the mold cavity during the injection pour of the urethane reaction mixture. The sprue passageway and disc downstream of the pour opening define a zone of turbulence which promotes mixing of the liquid urethane reaction mixture. The sprue material remaining on the disc upon separation of the base mold part from the middle part has a narrow or thin cross-section junction with the plastic body to form a severance zone which facilitates cleavage of the solidified urethane reaction sprue material from the plastic body and disc.

1 Claim, 2 Drawing Sheets

APPARATUS FOR MOLDING COMPOSITE METAL-ELASTOMER WHEELS

This invention relates to wheels for vehicles of the composite metal-elastomer styled automotive-type with a three-dimensional deeply contoured ornamental outboard face, and more particularly to molding apparatus and method for constructing such a wheel.

In the late 1960's and early 1970's Motor Wheel Corporation of Lansing, Mich., assignee of applicant herein, as well as its then parent company, The Goodyear Tire & Rubber Company of Akron, Ohio, developed and introduced an improved form of composite metal-elastomer styled wheel marketed under the registered trademark "POLYCAST". Such styled wheels provided an automotive type wheel in which metallic parts of simple, conventional configuration, for which manufacturing equipment was already available, are utilized as the basic structural components to thereby obtain a high strength standardized wheel construction at minimum cost. The aesthetically pleasing appearance was imparted to this standard steel backbone by a permanently adhered ornamental plastic body, either molded separately or in-situ as a homogeneous one-piece body or in the form of a plastic cover secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variations in styling and contour configurations were also obtained than were possible in the previous deep drawn styled all-steel wheels.

Various embodiments of such "POLYCAST" wheels, as well as methods and apparatus for producing the same, are set forth in the following U.S. Patents and pending U.S. patent applications assigned to the assignee herein, which are incorporated herein by reference:

| | | |
|---|---|---|
| U.S. Pat. No. 3,669,501 | 6/1972 | Derleth |
| U.S. Pat. No. 3,756,658 | 9/1973 | Adams |
| U.S. Pat. No. 3,762,677 | 10/1973 | Adams |
| U.S. Pat. No. 3,794,529 | 2/1974 | Thompson |
| U.S. Pat. No. 3,815,200 | 6/1974 | Adams |
| U.S. Pat. No. 3,918,762 | 11/1975 | Hampshire |
| U.S. Pat. No. 3,935,291 | 1/1976 | Jackson |
| U.S. Pat. No. 3,956,451 | 5/1976 | Adams |
| U.S. Pat. No. 4,017,239 | 4/1977 | O'Connell |
| U.S. Pat. No. 4,251,476 | 2/1981 | Smith |
| U.S. Pat. No. 4,398,770 | 8/1983 | Smith |
| U.S. Pat. No. 4,659,148 | 4/1987 | Grill |
| U.S. Pat. No. 4,682,820 | 7/1987 | Stalter |
| U.S. Pat. No. 4,786,027 | 11/1988 | Stalter |
| U.S. Pat. No. 4,790,605 | 12/1988 | Stalter |

Other prior art patents issued to unrelated parties and directed to various facets of such styled composite metal and plastic wheels include U.S. Pat. Nos. 3,823,982 and 3,998,494 as well as British Patent 1,290,946 (1972).

In one embodiment of the manufacture of such POLYCAST wheels, a portion of the mold comprises a conventional metal vehicle wheel having a drop center rim secured to a central disc or body having the usual bolt circle holes and a center aperture so that the disc can be mounted on an axle, drum or disc brake assembly. The metal wheel is employed in conjunction with an upper back-up clamp and lower mold part to define therewith a sealed cavity for molding and attaching a three-dimensional contoured plastic overlay, the overlay thus being molded in-situ and permanently attached to the outboard side of the wheel in the mold apparatus. Preferably, the wheel forms the upper surface of the mold cavity and a reaction mixture of a urethane elastomer liquid adhesive material is injected or poured into the mold to fill the cavity and contact the outboard surface of the wheel assembly. The urethane material solidifies to form a high density non-cellular elastomer body which permanently adheres to the outboard surface of the wheel subassembly. The plastic overlay may also be constructed from a lower density microcellular closed cell urethane elastomer adhesive material. The urethane material is allowed to solidify in the mold cavity and then the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

Hitherto, it has been customary in the commercial practice of molding the aforementioned "POLYCAST" wheels to provide in conjunction with the upper mold part a pour nozzle having a funnel-shaped entrance throat leading downwardly into a stem or neck portion having a reduced diameter cylindrical gate passage coaxial with the nozzle throat. The stem is surrounded by an annular elastomeric seal which registers and seals with the margin of a pour opening in the steel disc wheel. During the molding operation a special urethane mixing head nozzle is lowered onto the pour nozzle throat and the urethane reaction mixture is mixed in the mixing nozzle under relatively high pressure, say on the order of 2,000 pounds per square inch, and injected therefrom into the pour nozzle under a regulated exit pressure of about 50 pounds per square inch to thereby force the urethane reaction mixture into the mold cavity. At a predetermined time after the mixture has filled the cavity, the mixing head is retracted. Once the injected mixture has cooled and cured sufficiently for de-molding, the upper mold part, along with the pour nozzle carried thereon, is separated from the inboard side of the disc of the wheel by raising the same therefrom.

In many applications of the "POLYCAST" wheel construction, the aforementioned pour-hole has been provided as a dedicated opening in the bolt hole circle of the disc in the space between an adjacent pair of bolt holes, and a registering sprue passageway has been provided in a central core of the lower mold part for feeding the liquid urethane from the injection nozzle to the mold cavity. Since such a pour hole entered the outboard face of the disc in the "valley" between adjacent bolt holes, a relatively flat, thin-cross section radially outwardly extending sprue passage in the central core suffices for feeding the urethane to the mold cavity. This in turn leaves as a residue a relatively small, radially extending sprue member of cured urethane material on the outboard face of the disc. Since this cavity is normally covered by a removable hub cap, appearance is not factor, nor is the weight of the sprue flash considered a problem relative to subsequent wheel balancing. Moreover, if it is desired to remove such a shallow sprue flash piece, due to its thin cross section removal is not considered a serious problem.

However, recently in certain applications customer requirements have dictated the absence of a special pour hole and require that one of the bolt holes be utilized as a pour hole to communicate the injection nozzle with the mold cavity. In attempting to accommodate this requirement, a radially extending sprue passage was provided in the central core part of the lower mold which extended generally radially of the mold with a radially outwardly divergent taper to promote flow and reduce back pressure reflected into the nozzle. This need for reduced back pressure in the mold filling flow passage in turn was dictated by a change in the nature of the mixing nozzle employed which, although considered an improvement with respect to its capabilities of mixing the two-part liquid urethane reaction mixture than the prior nozzle, has been found to be more sensitive to back pressure conditions downstream from the nozzle exit. Although the provision of a "flat" (radially extending) and relatively deep sprue passage (axially of the wheel) would accommodate this improved but back-pressure-sensitive nozzle, the resulting sprue flash surrounding the bolt pore hole and leading out to a junction with the urethane body material coating the inner peripheral wall of the crown section of the disc presents a very noticeable sprue or runner in this area of the outboard face of the disc. Customer requirements dictate this residue material be removed due both to its unsightly appearance and excessive imbalancing weight. The stripping operation required to remove this material involves a knife cut through this material at its junction with the cylindrical wall of the urethane body material cast against the inner periphery of the crown of the disc. Due to the thickness of the junction of the sprue at this point considerable difficulty has been experienced in this knife trimming and sprue removal operation.

Accordingly, an object of the present invention is to provide an improved method of making a composite metal-elastomer wheel construction of the aforementioned POLYCAST styled wheel type which utilizes a bolt-hole pour opening and yet overcomes the aforesaid problem of excessive sprue material and thickness in the severance zone, facilitates the stripping step, provides a low back pressure flow condition during mold filling and provides an improved mixing condition for the two-part liquid urethane reaction mixture as the same enters the mold cavity.

Another object is to provide improved mold apparatus for practicing the aforementioned improved method which is economical in construction and reliable in operation.

BRIEF DESCRIPTION OF THE DRAWINGS

The invention, together with additional objects as well as features and advantages thereof, will become apparent from the following detailed description and the appended claims taken in conjunction with the accompanying scaled drawings, wherein:

FIG. 3 is a top plan view of the central core port of the mold apparatus of FIG. 2 shown by itself.

FIG. 4 is a cross-sectional view taken on the line 4—4 of FIG. 3.

Referring in more detail to the accompanying drawings, FIGS. 1 through 4 illustrate an exemplary but preferred embodiment of the improved apparatus for practicing the improved method of the invention for constructing a composite metal-elastomer styled wheel of the aforementioned type. As best seen in FIG. 2 (and also in FIG. 1), the wheel is generally designated at 20 and comprises, by way of a preferred example, a conventional drop center steel rim 22, a central steel disc or body 24 permanently secured, as by welding, to the rim, prior to the molding operation. Wheel 20 also includes an ornamental three-dimensional contoured overlay, generally designated at 26, secured to the outboard face of disc 24 and to the outboard surface of rim 22. Disc 24 is provided with a circle of bolt holes 28 and a central wheel spindle aperture 30 so that wheel 20 can be removably attached to a wheel hub and associated disc brake or drum brake assembly. For decorative purposes and for brake ventilation, a plurality of cut-outs or vent holes 32 are provided in disc 24. The particular configuration of the steel components of wheel 20, including rim 22 and disc 24, may follow solely utilitarian considerations such as strength of the wheel and ease and economy of manufacture, since the asthetic appearance of the wheel is determined largely by the three-dimensional contour of the ornamental overlay 26. The three dimensional contour of overlay 26 in turn is determined by the particular ornamental or asthetic appearance desired by the designer of wheel 20.

Figure 1:
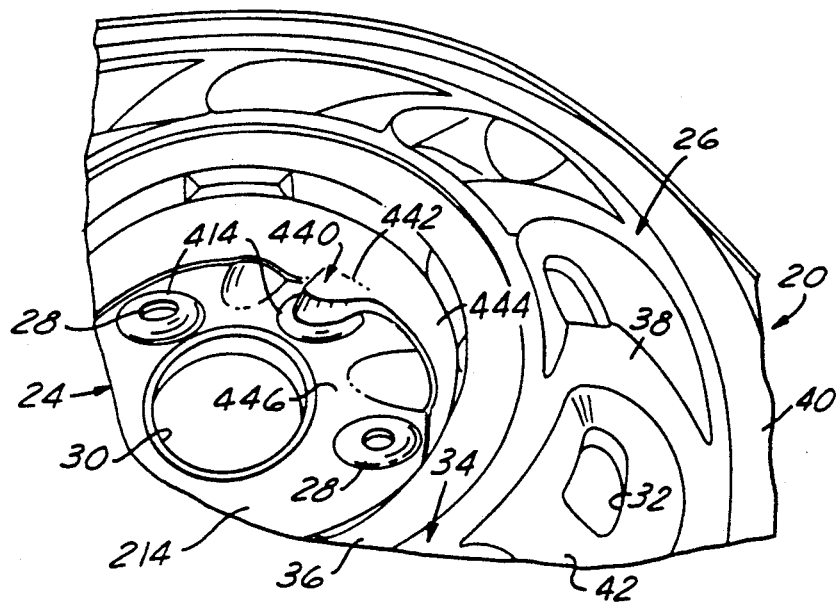
FIG. 1 is a fragmentary perspective view of the outboard side of a composite metal-elastomer styled wheel constructed in accordance with the method and apparatus of the present invention prior to removal of the solidified urethane sprue material.
Figure 2:
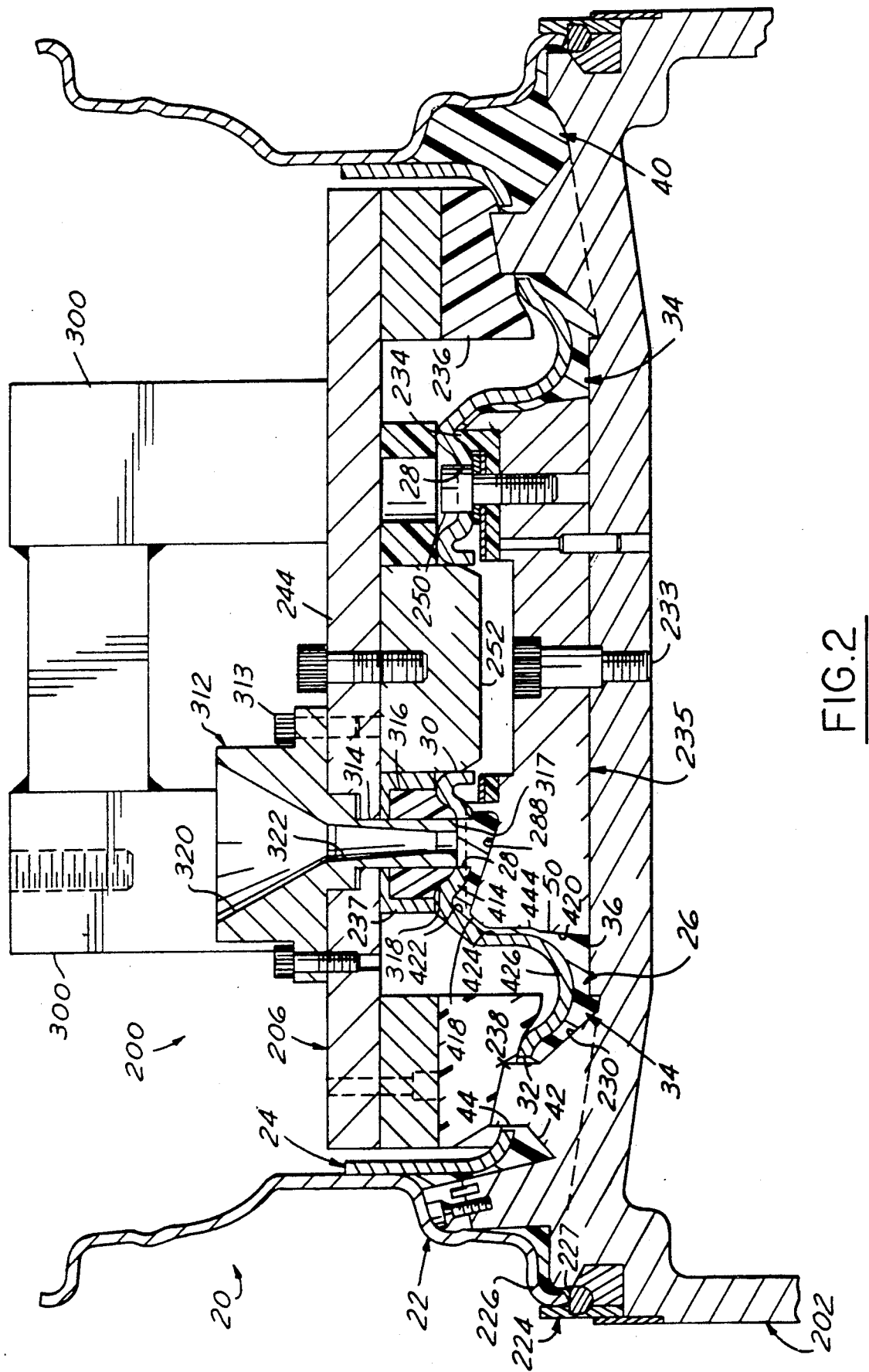
FIG. 2 is a vertical center cross-sectional view of the mold apparatus of the invention showing the upper and lower mold parts juxtaposed in assembly to the disc and rim subassembly and provided with a preferred embodiment of a sprue passageway in accordance with the present invention.

In the ornamental exemplary design of FIGS. 1 and 2, overlay 26 has a central annular section 34 with a generally smooth inset hubcap mounting face 36, and a plurality of fins 38 which radiate outwardly from section 34 to an outer annular peripheral portion 40. Pockets 42 are provided between each adjacent pair of fins 38 which extend axially inboard to provide a urethane aperture 44 within each disc aperture (cut-out or vent hole) 32. Section 34 of overlay 26 has an internal, slightly frustoconical wall 50 diverging outboard axially of the wheel and terminating at hub cap mounting surface 36. Wall 50 defines a relatively large cavity in the center of overlay 26 and is adapted to receive the vehicle wheel spindle therein in a mounted condition of wheel 20.

FIGS. 2-4 also illustrate an improved molding apparatus, and improved method of making wheel 20 utilizing such apparatus, in accordance with the invention, which incorporate many of the features of the molding apparatus and method illustrated in conjunction with FIGS. 7 through 11 of the aforementioned Adams U.S. Pat. No. 3,762,677, which is incorporated herein by reference. Likewise, the molding apparatus or mold 200 described in columns 11-16 of the '677 patent is incorporated herein by reference, and identical reference numerals are employed in FIGS. 2 and 3 to identify elements alike in structure and/or function.

Mold apparatus 200 thus comprises the three main components: namely, a lower mold part 202 (FIG. 2), the metal wheel subassembly 22-24, and an upper mold half 206 which serves as a backup support for clamping wheel subassembly 22-24 onto mold part 202. Lower mold part 202 has an annular lip in the form of a resilient seal 224 adapted to seat against an annular portion of the outer periphery of the outboard flange 226 of rim 22. Mold part 202 also has a surface 230 on its upper side radially inwardly of seal 224 adapted to define, with the outboard face of wheel subassembly 22-24, a mold cavity in which the decorative plastic overlay 26 is cast, the same being suitably contoured to provide the ornamental configuration to form the outboard decorative face 38, 40 and 42 of wheel 20.

To assemble mold 200, wheel subassembly 22-24 is placed against lower part 202 as shown in FIG. 2 with the outboard tire bead-retaining flange 226 of rim 22 resting on or in light contact with a seating surface 227 associated with seal 224. This also lightly seats the bolt circle portion 214 of disc 24 against an annular inner seal 234 mounted on the upper face of a mold pedestal or core 235 which in turn is seated on the center of surface 230 of mold part 202 and removably secured thereto by a stud 233. Pedestal 235 provides a core to form the wall 50 defining the wheel well cavity in the center of overlay 26. Seal 234 is adapted to seal the mold cavity around its inboard inner perimeter in the fully seated condition of wheel subassembly 22-24 on mold part 202.

Upper mold part 206 has two pairs of upright posts 300. These posts in turn are fastened to a suitable molding press ram for raising and lowering of upper mold part 206 as will be well understood in the art. This apparatus is used to urge upper mold part 206 downwardly against wheel subassembly 22-24 as shown in FIG. 2 to clamp mold 200 in its fully closed position.

Mold part 206 has a resilient annular pad 236 having a configuration on its underside adapted to seat against the inboard face of disc 24 in overlying relation to disc vents 32 and associated core protrusions 238 of lower mold part 202 to thereby force the disc-rim subassembly 22-24 further toward part 202 and then retain parts 202 and 22-24 in sealing engagement. A steel funnel 312 is secured by bolts 313 onto the upper surface of clamp plate 244 and has a coaxial neck 314 which extends downwardly through a washer seal 316 disposed within seal 237, the lower end face 317 of neck 314 being disposed slightly above (recessed) or in flush relation to the lower end face 318 of washer seal 316.

As indicated previously, disc 24 is not provided with a specially provided pour opening between a pair of adjacent bolt holes 28 as is otherwise customary. Instead, neck 314 of funnel 312 and washer seal 316 are positioned for coaxial registry with a selected bolt hole 28 which serves as the disc pour opening, and the lower face 318 of seal 316 seats in sealed relation on the inboard face of disc 24 around the embossed margin of such bolt hole pour opening 28.

In accordance with a primary feature of the present invention, pedestal core 235 has a specially configured notch 288 (FIGS. 2, 3 and 4) in its upper surface which registers with the bolt hole pour opening 28 and funnel neck 314 to serve as a sprue passageway for directing the liquid urethane reaction mixture into the mold cavity during pouring of the mold, sprue passageway 288 being described in more detail hereinafter.

Lower mold part 202 has a locating pin 250 affixed to and protruding upwardly from pedestal 235 parallel to the wheel axis which protrudes through an associated other one of the disc bolt holes 28 in the closed condition of the mold for angularly locating the rim-disc subassembly 22-24 accurately on the lower mold part 202. Upper mold part 206 has a central locating core 252 projecting through the disc center opening (spindle aperture) 30 and into the space below disc 24, core 252 having a close clearance fit with disc center hole 30 to thereby center the metal wheel subassembly 22-24 relative to the upper mold part 206 in the closed condition of the mold 200. Funnel 312 has a conical throat portion 320 downwardly convergent and communicating with a coaxial tapered neck passageway 322 which opens at its lower end at face 317 of neck 314.

In accordance with a principal feature of the present invention, pedestal core 235 of mold apparatus 200 is provided with a specially configured notch-like sprue passageway 288. Referring in more detail to FIGS. 3 and 4, passageway 288 is defined by a radially inwardly directed inset in an upper marginal flange wall 400 of core 235 which in turn defines a cavity 402 in the upper face of core 235 for receiving seal 234. More particularly, sprue passageway 288 is formed by a wall 404 having an upper edge flush with the plane of the upper edge surface of margin flange 400. The rear vertical (axially extending) surface 406 of passageway 288 is semi-cylindrical, having a radius of curvature centered on an axis 408 (FIG. 3) intended for coaxial alignment with the axis of funnel 312 and pour bolt hole 28 in the assembled condition of the mold apparatus 200. Sprue passageway 288 is defined on its sides by a pair of radially outwardly divergent side walls 410 and 412 (FIG. 3) which extend tangentially from surface 406 radially outwardly to the outer periphery of core 235. Walls 410, 412 preferably define an included angle of about 30°. For a bolt hole 28 having a diameter of 0.583 inches, the radius of curvature of wall 406 is preferably 2 inches. Inasmuch as the pour bolt hole 28 is defined by a semispherically shaped embossment 414 (FIGS. 1 and 2), the margin of this embossment defining the bolt hole 28 will protrude downwardly slightly below the plane of the upper edge 416 of wall 404 in the assembled condition of mold apparatus 200.

As will be best seen in FIGS. 2 and 4, the outer peripheral wall of core 235 is defined by a chamfered surface 418 formed in its upper edge and by a downwardly and radially outwardly slightly divergent main wall 420. These walls are circular and are designed to be spaced from the corresponding inner peripheral surfaces 422 and 424 of disc 24 in mold assembled condition by a predetermined distance, as best seen in FIG. 2, typically about 1/16th of an inch, until the inner periphery of the disc and the outer periphery of core 235 diverge at the crown portion 426 of the hat section of disc 24.

In accordance with the primary feature of the present invention, sprue passageway 288 has a flat bottom wall 430 inclined upwardly and radially outwardly at an angle of about 20° relative to the plane of the upper edge 416 of core 235 (or at an angle of 70° relative to the axis of core 235 and disc 24, as well as to the axis of funnel 312). Wall 430 terminates radially inwardly at a curved inner edge junction 432 with wall 406, and radially outwardly at a curved outer edge 434 intersecting the chamfer surface 418 spaced below the plane of edge 416. Wall 430 in the aforementioned working example has a depth axially of core 235 from edge 416 to bottom wall edge 432 of about 11.0 millimeters, and from outer edge 434 to the plane of edge 416 axially of core 235 of about 3.0 millimeters.

In operation, during the mold filling phase of the molding cycle, the two part liquid urethane reaction mixture is fed from the mixing nozzle (not shown) downwardly through the neck passageway 322 of nozzle 312 so as to exit as a pressurized stream from the outlet of the nozzle into the wedge shaped pour sprue 288. The stream impinges against bottom wall 430 and makes a generally 110° change in direction. It then swirls radially outwardly and around the downstream hempisherical edge of the bolt hole embossment 414 protruding into sprue passageway 288 approximately half way between the radially inner and outer limits of the passageway. The liquid mixture then enters the mold cavity in the clearance between the surfaces 418 and 422. Flow radially inwardly from this space is blocked by the seal 234 so that urethane material does not cover the surface of the bolt circle portion of disc 24, except in the area of the disc bolt circle surface directly exposed to sprue passageway 288.

After the injection filled mold assembly has been allowed a sufficient time to complete the cure of the urethane mixture forming the ornamental overlay 26, mold 200 is opened by raising upper mold half 206 to separate the same from the disc and rim subassembly 22-24. Before this occurs, it will be noted that a sprue of solidified and cured urethane reaction material will have formed in the sprue passageway 288 and the bolt hole pour opening 28. This sprue 440 is best illustrated in FIG. 1, and has a junction zone indicated by the broken line 442 in FIG. 1 with the thin inner peripheral wall 444 of urethane material cast against the inner peripheral wall 422 of disc 24. After the wheel 20 has been separated from lower mold part 202 with the decorative urethane body 26 cast and cured thereagainst, the same is ready for the sprue stripping operation. The pour sprue 440, which is left over the bolt hole embossment 414 of the selected bolt hole pour opening 28, is configured such that its thinnest section is close to the urethane wall 444. The thickness dimension (axially of the wheel) in turn generally corresponds to the spacing axially between sprue exit edge 434 and the plane of edge 416. Hence sprue 440 may be readily cut through at the junction 442 with a stripper knife to thereby sever sprue 440 from the urethane of overlay 26, and then readily removed from the metal face of the bolt circle portion 446 of disc 24. Preferably, this face is soaped or other suitable release agent applied thereto in the area juxtaposed to sprue passageway 288 prior to placing of the wheel-disc subassembly 22, 24 onto lower mold part 202 in the mold assembly phase of the operation. Any minor residual urethane clinging to the wall of the bolt hole pour opening 28 is removed therefrom after sprue 440 has been stripped from the wheel.

In addition to substantially reducing the thickness of the junction of sprue 440 at 442 with wall 444 to thereby greatly facilitate knife cutting and stripping of sprue 440, it has been found that the wedge shaped sprue passageway 288, as contrasted to the prior "flat" sprue passageway of the prior mold apparatus, functions as an after mixer for the two-part liquid urethane reaction mixture and promotes better mixing of the same as it enters the mold cavity. This in turn contributes to a reduction in molding defects. Although it is not completely understood why this occurs, it has been theorized that the inclined bottom wall 430 forms one or more turbulence-inducing zones in conjunction with embossment 414, and also that the restriction at edge 434 at the outlet of sprue passageway 288 creates further turbulence to promote such after mixing. In addition, these turbulence creating restrictions, being located downstream and thus relatively remote from the exit of nozzle passageway 322, avoid creating an undue back pressure condition in the mixing nozzle to which the same is found to be sensitive in practice. These additional benefits were found as an unexpected by-product of the effort to reduce the cross-sectional thickness in the stripping zone of sprue 440, and have contributed to the commercial success of the improved sprue passageway of the invention.

From the foregoing description, it will now be apparent that the present invention provides an improved mold apparatus and method of constructing "POLYCAST" composite and metal-elastomer styled wheels which satisfies the aforementioned objects, resulting in reduced processing and material costs without thereby increasing the time to require to injection-fill the mold cavity. It is also to be understood, that although the foregoing description and drawings describe and illustrate in detail a successful working embodiment of the present invention, to those skilled in the art to which the present invention relates, the present disclosure will suggest many modifications and constructions as well as widely different embodiments and applications without thereby departing from the spirit and scope of the invention. The present invention, therefore, is intended to be limited only by the scope of the appended claims and the applicable prior art.

We claim:

1. In an apparatus for molding a composite styled wheel, said apparatus comprising a middle mold part, said middle mold part comprising a subassembly of a metal disc and rim operable as a metal street wheel when a pneumatic tire is mounted on said metal disc and rim subassembly, said apparatus further comprising a base mold part having an annular lip in sealing engagement against an annular portion of an outboard face of said metal disc and rim subassembly in a closed condition of said molding apparatus, said base mold part having a mold cavity surface to provide an ornamental configuration for an outboard face of a plastic body of said composite styled wheel, said mold cavity surface in said closed condition of said mold parts defining with at least part of the outboard face of said metal disc and rim subassembly a mold cavity axially adjacent thereto, said apparatus further comprising a clamp located to seat against an inboard face of said metal disc and rim subassembly for urging said metal disc and rim assembly into said sealing engagement with said base mold part, said mold parts being axially separable from one another to open said molding apparatus and to clear said metal disc and rim subassembly from said clamp and base mold parts, the improvement wherein said clamp includes funnel means adapted for receiving a mixing injection of a liquid urethane reaction mixture, said funnel means having a nozzle outlet passage registering with a pour opening in said metal disc in the closed condition of said mold parts, and sprue means affixed to said base mold part in juxtaposed relation to said disc pour opening, said sprue means and a margin of said disc pour opening cooperating to define a restricted access opening to said mold cavity during injection of said liquid urethane reaction mixture, said sprue means being configured to promote turbulent flow of said liquid urethane reaction material during injection of said liquid urethane reaction mixture in mold filling, said sprue means and said metal disc defining a narrow cross-sectional severance zone when the liquid urethane reaction mixture is cured forming a residual sprue to thereby facilitate severance of such residual sprue from the plastic body after separation of said base mold part from said disc and rim subassembly to thereby facilitate removal of said sprue from the outboard surface of said disc, said sprue means comprising a body affixed to said base mold part so as to remain stationary thereon during mold separation, said body having a notch serving as a sprue passageway partially surrounded by a disc pour hole embossment portion, said embossment portion protruding into said sprue passageway and being concentric with said disc pour opening, said passageway having an annular flow space surrounding said disc embossment portion, said annular flow space having a predetermined depth in a direction of initial in-flow sufficient to permit adequate injection, said sprue passageway having a downstream portion extending generally radially outwardly of said subassembly from a longitudinal axis of said pour hold embossment and in-flow of said reaction mixture under pressure, said sprue passageway in a first cross-sectional plane defined by said embossment axis and a radius of said subassembly narrowing in the flow direction away from said pour opening toward a junction with the mold cavity, said pour opening comprising a preselected pre-existing bolt hold provided in said disc for receiving wheel fastening means for mounting said disc and rim subassembly to a wheel mounting part of a vehicle, said bolt hole being defined by a generally hemispherically shaped bolt hole embossment protruding axially outwardly from a bolt-circle face of said disc and into said sprue passageway to define a restricted passage therebetween to thereby define a zone of turbulence in the annular flow space and in said passageway downstream portion to help induce mixing in said sprue passageway, said sprue passageway of said sprue means being wedge shaped and defined by a bottom wall juxtaposed to said bolt-hole pour opening of said disc in the closed condition of said mold, said bottom wall being inclined to define a deepest portion of said passageway juxtaposed to said disc pour opening and a shallowest portion at said mold cavity junction, said sprue passageway also being defined by a curved end wall generally concentric with said longitudinal axis of said disc pour hold embossment portion and disposed radially inwardly of said subassembly therefrom, said sprue passageway being further defined by a pair of opposed side walls which extend from said curved end wall and diverge from one another radially outwardly of said subassembly so that said downstream portion widens in a second cross-sectional plane perpendicular to said first cross-sectional plane, the included angle between said side walls being about 30 degrees, said bottom wall of said sprue passageway of said sprue means being inclined at an angle of about 20 degrees to a radius of said subassembly and about 70 degrees to said longitudinal axis of said pour hole embossment and a longitudinal axis of said funnel nozzle outlet passage to produce about a 110 degree flow directional change in said sprue passageway.

* * * * *